UNITED STATES PATENT OFFICE.

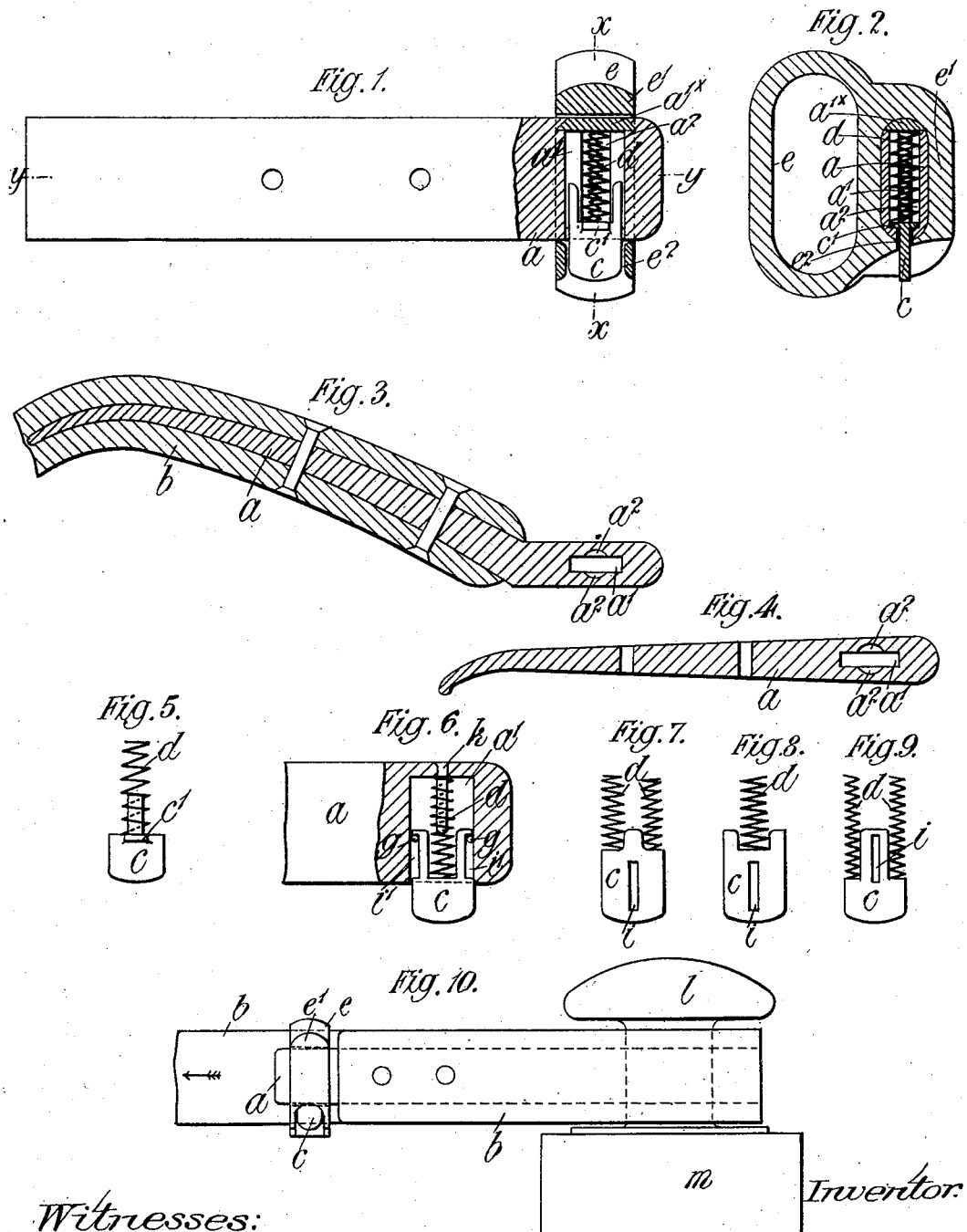

ALFRED WOOD, OF FOLKESTONE, ENGLAND.

HARNESS.

SPECIFICATION forming part of Letters Patent No. 701,659, dated June 3, 1902.

Application filed September 9, 1899. Serial No. 729,909. (No model.)

*To all whom it may concern:*

Be it known that I, ALFRED WOOD, carriage-builder, a subject of the Queen of Great Britain, residing at Fairlight House, Folkestone, England, have invented certain new and useful Improvements in Harness, of which the following is a specification.

This invention relates to improvements in fastenings for harness of the kind in which the traces, pole-pieces, or other parts of the harness may be expeditiously disconnected and the draft-animal thereby readily released from the vehicle or other object to which it is harnessed, and has for its object to secure increased safety and efficiency combined with simplicity of construction and the reduction of the liability of the parts to corrode.

According to my invention I employ a curved or bent arm (the curved end of which is secured to the trace, pole-piece, or other required part of the harness) in combination with a sliding ring or band provided with a loop, which sliding ring or band is located on the trace, pole-strap, or other part of the harness. A spiral spring or its equivalent (preferably of non-corrosive metal) is entirely inclosed in a cavity formed in one member of the fastening and actuates a bolt which coöperates with a slot or recess formed in the other member of the fastening.

In order that my invention may be clearly understood and readily carried into effect, I will now proceed to describe the same more fully with reference to the accompanying drawings, in which—

Figure 1 is a sectional side elevation of one form of device made according to my invention, showing the bolt and spring in elevation. Fig. 2 is a vertical section on line $x$ $x$, Fig. 1. Figs. 3 and 4 are longitudinal sectional views on line $y$ $y$, Fig. 1, of bent arms for use with trace-studs in double harness or with single-horse traces and pole-straps, respectively, showing the special form of cavity for the bolt and spring shown in Figs. 1 and 2. Fig. 5 shows an alternative form of bolt which may be used with the devices shown in Figs. 1 and 2. Figs. 6, 7, 8, and 9 show modifications of bolts and springs for fitting into the cavity in the curved arm. Fig. 10 shows the end of a trace provided with my invention and in engagement with a trace-stud.

Referring to Figs. 1 to 5, $a$ is the curved arm to which the trace or other part $b$ of the harness is secured. $a'$ is a cavity in the free end of the arm $a$, and $c$ is a bolt arranged to slide in this cavity. $d$ is a spiral spring which is situated within the cavity $a'$ and tends to thrust out the bolt $c$. The cavity $a'$ is formed right through the arm $a$. The bolt $c$ and spring $d$ are inserted in the cavity $a'$, and the said cavity is then closed by a dovetail piece $a'^\times$, which fits a corresponding groove in the arm $a$ and may be soldered or brazed in position. $e$ is a band or ring sliding upon the trace or other part of the harness to which the arm $a$ is attached, and having a loop $e'$, provided with a slot $e^2$, with which the bolt $c$ normally engages. The bolt $c$ is provided with a lug or projection $c'$ on each side thereof, which loosely fit corresponding recesses $a^2$ in the cavity $a'$. These recesses serve to support the spiral spring $d$ and form shoulders which operate in conjunction with the lugs or projections $c'$ to limit the outward movement of the bolt $c$. The bolt $c$ normally passes through the slot $e^2$, and when it is required to release the trace or other part of the harness to which the invention is applied the said bolt is pushed up into the cavity $a'$, and the loop $e'$ is then slid off the end of the arm $a$. The corners of the bolt $c$ are rounded, and the ends of the slot $e^2$ are also rounded, so as to facilitate the loop $e'$ being slid off the arm $a$, as aforesaid.

In the forms of springs and bolts shown in Figs. 6, 7, 8, and 9 the cavity $a'$ in the arm $a$ is formed without any recess therein, and the bolt $c$ has no lugs or projections thereon, such as $c'$, in the foregoing figures. In place of such recess and lugs or projections the bolt in Fig. 6 has recesses $i'$, engaging with fixed stops $g$, to limit the movements of the bolt, and the bolts shown in Figs. 7, 8, and 9 are each provided with a slot $i$, with which a stop, such as $g$ in Fig. 6, is adapted to engage. The springs and bolts are inserted into the open ends of the cavities $a'$, and the stops $g$ are then fixed in position. Each of the spiral springs may either be used singly or may have another spring (preferably coiled in the opposite direction) placed within it, as shown in Fig. 1, in order to afford additional strength. A headed pin (such as *k*, Fig. 6) may be inserted in the top of the spring or springs to prevent the lateral bending when the spring is compressed.

The bolt *c* is preferably arranged to protrude downwardly, so that even should the spring fail or break the said bolt would maintain its position by gravity and the fastening still hold.

The spiral springs can be made of non-corrosive metal, such as nickel, and by completely inclosing these springs in one or other member of the fastening they are effectively protected from mud, water, &c., and the fastening is consequently rendered more reliable.

Fig. 10 shows a trace-stud *l* of the kind commonly employed with double harness and carried by the splinter-bar *m*. A loop at the end of the trace *b* is in engagement with the trace-stud *l*, the band *e* being slidably mounted on said trace and the end of the arm *a* passing through the offset-loop *e'* and being retained in position by the bolt *c*, as above described. Should it be required to quickly detach the trace *b* from the stud *l*, even though a pull is being exerted upon the said trace, the bolt *c* is pushed upwardly into its recess *a'*, and the band *e* is then slid along the trace *b* in the direction of the arrow, thereby passing the offset-loop *e'* over the end of the arm *a*, and thus releasing the trace *b* from the bolt *l*.

What I claim is—

1. A fastening for harness, comprising an arm member attached to the harness-strap, a band member adapted to slide on said strap, and a loose bolt adapted to slide in one of said members and to normally engage with the other of said members, substantially as described for the purpose specified.

2. A fastening for harness, comprising a curved arm member attached to the harness-strap, a band member provided with a loop and adapted to slide on said strap, a loose bolt adapted to slide in a recess in one of said members and to normally engage with the other of said members, and means for retaining said bolt in engagement, substantially as described for the purpose specified.

3. A fastening for harness, comprising a curved arm member attached to the harness-strap, a band member provided with a loop and adapted to slide on said strap, a loose bolt adapted to slide in a recess in one of said members and to normally engage with the other of said members, a spiral spring for retaining said bolt in engagement, and means for disengaging said bolt against the pressure of said spring in order to release the fastening, substantially as described for the purpose specified.

4. In a fastening for harness, the combination of a curved arm attached to the harness-strap and having a recess in its free end, a band adapted to slide on said harness-strap, a loop formed on said band and provided with a slot through one end, a loose bolt confined in the recess in the said curved arm and normally projecting into the slot in the said loop, and means for normally retaining the bolt in such projecting position, substantially as described for the purpose specified.

5. In a fastening for harness, the combination of a curved arm attached to the harness-strap and having a recess in its free end, a band adapted to slide on said harness-strap, a loop formed on said band and provided with a slot through one end, a loose bolt confined in the recess in the said curved arm and projecting into the slot in said loop and a spiral spring inclosed in the recess in the curved arm for normally retaining the bolt in such projecting position, substantially as described for the purpose specified.

6. In a fastening for harness, the combination of a curved arm attached to the harness-strap and having a recess in its free end, a band adapted to slide on said harness-strap, a loop formed on said band and provided with a slot through one end, a loose bolt confined in the recess in the said curved arm and projecting into the slot in the said loop, a spiral spring inclosed in the recess in the curved arm for normally retaining the bolt in such projecting position, means for supporting said spiral spring, and means for pressing the bolt into the recess in the curved arm against the force of the spiral spring in order to release the fastening, substantially as described for the purpose specified.

In testimony whereof I have hereunto set my hand, in presence of two subscribing witnesses, this 1st day of August, 1899.

ALFRED WOOD.

Witnesses:
WM. M. JENNER, Jr.,
F. W. PIERSON.